(12) United States Patent
Teruzzi et al.

(10) Patent No.: US 10,240,649 B2
(45) Date of Patent: Mar. 26, 2019

(54) CALIPER FOR DISC BRAKE

(71) Applicant: Freni Brembo S.p.A., Curno, Bergamo (IT)

(72) Inventors: Andrea Teruzzi, Curno (IT); Fabio Scotti, Curno (IT)

(73) Assignee: Freni Brembo S.p.A., Curno (IT)

(*) Notice: Subject to any disclaimer, the term of this patent is extended or adjusted under 35 U.S.C. 154(b) by 0 days.

(21) Appl. No.: 15/636,913

(22) Filed: Jun. 29, 2017

(65) Prior Publication Data

US 2018/0003251 A1    Jan. 4, 2018

(30) Foreign Application Priority Data

Jun. 30, 2016  (IT) .............................. UA2016A4801

(51) Int. Cl.
| | |
|---|---|
| *F16D 65/18* | (2006.01) |
| *F16D 65/00* | (2006.01) |
| *F16D 55/225* | (2006.01) |
| *F16D 65/097* | (2006.01) |
| *F16D 55/00* | (2006.01) |

(52) U.S. Cl.
CPC ....... *F16D 65/0068* (2013.01); *F16D 55/225* (2013.01); *F16D 65/097* (2013.01); *F16D 65/0975* (2013.01); *F16D 65/0977* (2013.01); *F16D 65/18* (2013.01); *F16D 2055/0029* (2013.01)

(58) Field of Classification Search
CPC .. F16D 65/0068; F16D 65/18; F16D 65/0977; F16D 2055/0029; F16D 55/224
See application file for complete search history.

(56) References Cited

U.S. PATENT DOCUMENTS

| | | | |
|---|---|---|---|
| 5,249,647 A | 10/1993 | Kobayashi et al. | |
| 8,376,092 B2 * | 2/2013 | Lethorn | F16D 65/0977 188/72.3 |
| 2007/0251772 A1 * | 11/2007 | Tsurumi | F16D 65/095 188/73.38 |

(Continued)

FOREIGN PATENT DOCUMENTS

| | | |
|---|---|---|
| FR | 2 508 128 A1 | 12/1982 |
| GB | 1278747 A | 6/1972 |

*Primary Examiner* — Vishal R Sahni
(74) *Attorney, Agent, or Firm* — Blank Rome LLP

(57) ABSTRACT

A caliper for disc brake comprising a caliper body housing at least one pair of pads disposed on opposite sides along an axial direction and comprising at least one thrust piston which interfaces with the pad so as to press it against the associable brake disc, and at least one return spring that exerts a return thrust on the support plate of the pad. The return spring comprises a fixing portion to the caliper body that extends from axially opposite sides in separate thrust branches, each thrust branch interfacing with a support plate of a related pad. Each thrust branch comprises a first rectilinear portion that extends towards the corresponding pad, a curved portion, integral with the first rectilinear portion and folded in approach to the fixing portion, a second rectilinear portion that extends from the curved portion in approach to the fixing portion. The second rectilinear portion terminates with a free cantilevered end and interfaces with an edge of the support plate.

11 Claims, 6 Drawing Sheets

(56) References Cited

U.S. PATENT DOCUMENTS

2012/0186918 A1* 7/2012 Wakabayashi ...... F16D 65/0972
                                                188/72.3
2013/0256068 A1* 10/2013 Hazeki ................. F16D 55/226
                                                188/72.4
2015/0122596 A1   5/2015 Ruopp

* cited by examiner $$K = \frac{E \times b \times h^3}{4 \times l^3}$$

$$K = \frac{K_1 + K_2}{K_1 \times K_2}$$

CALIPER FOR DISC BRAKE

FIELD OF THE INVENTION

The present invention relates to a caliper for disc brake. The caliper for disc brake according to the present invention particularly, but not exclusively, finds application in the automotive industry.

DESCRIPTION OF THE RELATED ART

In particular, as is known, in calipers for disc brakes, the pads are pressed, by at least one piston, against the braking band of the associable brake disc. When releasing the braking, the piston stops the thrust action exerted; however, the pad that is in contact with the brake band tends to remain in position, thereby generating a residual braking torque as well as an annoying noise and a noticeable vibration on the steering wheel or handlebar, in the case of motorcycles.

SUMMARY OF THE INVENTION

In order to solve these problems, it is known to provide the calipers for disc brake with return plates or springs that exert a thrust action on the pads away from the brake disc. Of course, when braking, such a thrust action away is overcome by the braking action exerted by the pistons but, in the release step, said return springs exert sufficient thrust to move the pads away from the brake disc, preventing contact between the pads and the brake disc when no braking action is requested. The return springs are fixed to portions of the caliper body and act onto plates of the pads that support the friction portion of the pad; the friction portion goes in direct contact with the braking band of the brake disc, while the support plate on the one hand supports the friction portion and on the other hand receives and transmits the caliper piston thrust to the friction portion. The support plate, unlike the friction portion, it does not go in contact with the brake disc and is therefore not subject to wear.

The support plate interfaces with the return spring so as to receive the elastic action of removal of the pad from the disc, and allow the detachment of the friction portion from the braking band when the braking action ends.

Such prior art solutions have some drawbacks and disadvantages.

In fact, in the known solutions the elastic force or load exerted by the return spring does not remain constant over time but varies depending on the degree of wear of the friction portion of the pad.

In fact, the friction portion of the pad has a thickness strongly variable in the useful life of the pad that goes from an initial thickness that can even exceed 20 mm to a final thickness, in case of maximum wear, of the order of a millimeter or less.

As the degree of wear of the friction portion increases, the position at rest (i.e. in the absence of braking action) of the pad advances as a whole and progressively towards the braking band. Such a position at rest, as is known, is each time guaranteed by the corresponding advancement of the thrust pistons of the caliper body, which progressively protrude increasingly from the corresponding piston seats of the caliper body.

The return springs are usually placed at fixed points of the caliper body and do not move according to the degree of wear of the friction portion of the pads.

It follows that the thrust branches of the return springs work on portions of the support plates that are variable in space, depending on the degree of wear.

For this reason, the elastic thrust exerted by the return springs, dependent on the distances between the cantilevered portions or branches of said springs and the support plates, in turn varies depending on the degree of wear of the friction portion.

Typically, such an elastic thrust is smaller in condition of little wear and increases more or less progressively with increasing degrees of wear of the friction portion.

Usually, the pattern law of the return spring elastic load has a more or less pronounced ramp, depending on the type of spring and the degree of wear of the friction portion of the pad.

The variability of the elastic return thrust of the spring involves certain drawbacks.

In fact, for the elastic return action of the pad to be effective in all operating conditions of the caliper, it should be ensured that such a return force is always greater than a threshold value. This means that in low or absent wear conditions, such elastic return force must still be guaranteed and then, as the degree of wear increases, this force will increase more and more.

It therefore happens that in conditions of heavy wear, the elastic return force is much greater than the initial condition of poor or no wear. Excessive variability of the elastic return force involves some disadvantages: in fact, the thrust to be exerted on the control of the braking device (be it lever or pedal) increases proportionally since the return spring continuously exerts its elastic action on the pad.

This variability of the braking control is little appreciated by users; also, in case of electrical or electro-hydraulic actuation, the electrical consumptions of the system increase accordingly and the actuating devices need to be oversized.

Also, if the elastic return force is very high, and is not sufficiently aligned with the cylinder of the caliper body arranged behind the plate and/or with the axial guides of the pads, there is a risk of rotations and jibbing and thus of the pad in the retraction step.

In particular, the rotation of the pad has negative effects both in terms of retraction and in terms of wear of the pad itself. In fact, the rotation of the pad tends to make it jib on the guide and prevents a complete retraction sufficient to eliminate the residual torque. In addition, the pad portion that remains in contact with the brake disc tends to wear out and thus generate an abnormal consumption of the pad braking surface.

Moreover, such abnormal consumption also impacts on effective braking and may cause the onset of vibrations and noises during braking itself.

For all these reasons, the need of solving the drawbacks and limitations mentioned with reference to the prior art is therefore felt.

Such a need is met by a caliper for disc brake comprising a caliper body having a pair of half-bodies interconnected by at least one connection bridge, wherein the caliper body at least partly delimits a housing compartment for an associable disc brake and houses at least one pair of pads disposed on opposite sides to said housing compartment along an axial direction, the pads comprising a support plate and a friction portion suitable to exercise a friction action on the associable brake disc, the caliper body comprising at least one thrust piston actuable in parallel to the axial direction, in which the thrust piston interfaces with the support plate of the pad in so as to press the friction portion against the associable brake disc, wherein the caliper body comprises at least one return spring that exerts a return thrust on the support plate of the pad, directed parallel to the axial direction in a direction of approach to the pistons and of moving away from the associable brake disc, wherein the return spring comprises a fixing portion to the caliper body that extends from axially opposite sides in separate thrust branches, each thrust branch interfacing with a support plate of a related pad, wherein that each thrust branch comprises a first rectilinear portion that extends from the fixing portion towards the corresponding pad, a curved portion, integral with the first rectilinear portion and folded in approach to the fixing portion, a second rectilinear portion that extends from the curved portion in approach to the fixing portion, wherein the second rectilinear portion terminates with a free cantilevered end, the second rectilinear portion interfacing with an edge of said support plate and exerting on said return thrust, the cantilevered free end being spaced from the first rectilinear portion and from the fixing portion.

According to a possible embodiment, the curved portion has a circumferential trend that extends for at least 180 degrees, connecting the first and second rectilinear portion with each other.

According to a possible embodiment, the curved portion ends with a rectilinear appendage that identifies, with the second rectilinear portion, on the side opposite to the cantilevered free end, a substantially right angle.

According to a possible embodiment, the second rectilinear portion is dimensioned so as to interface with the support plate of the pad from a condition of no wear, or minimum wear, of the friction portion, to a condition of maximum wear of the friction portion, the cantilevered free end interfacing with the support plate in said condition of maximum wear.

According to a possible embodiment, the return spring is dimensioned so that, in the condition of no wear, or minimum wear, of the friction portion, the second rectilinear portion rests on the support plate so as to be aligned along an oblique direction incident with the axial direction.

According to a possible embodiment, the return spring is dimensioned so that, in the condition of maximum wear, of the friction portion, the second rectilinear portion rests on the support plate so as to be aligned along a horizontal direction parallel to the axial direction.

According to a possible embodiment, the return spring is dimensioned so that, in the operating conditions of the pad, from the condition of minimum to maximum wear of the friction portion, the cantilevered free end always remains spaced from the first rectilinear portion and the fixing portion, so as to be free to flex elastically.

According to a possible embodiment, each thrust branch is shaped so as to have an equivalent stiffness K defined as follows:

$$K=(K1+K2)/(K1*K2)$$

wherein

K is the equivalent stiffness of each thrust branch,

K1 is the stiffness of a leaf spring having a length L1 equal to the distance, projected on the axial direction, between the fixing portion to the caliper body and a connection point between the curved portion and the second rectilinear portion, and wherein K2 is the stiffness of a leaf spring having a length L2 equal to the distance, projected on the axial direction, between the fixing portion to the caliper body and the cantilevered free end.

According to a possible embodiment, said thrust branches have a rectangular section having base b and height h, the base being arranged parallel to the axial direction.

According to a possible embodiment, the spring is shaped so that $$K1=(E*b*h3)/(4*L13)$$

$$K2=(E*b*h3)/(4*L23)$$

and wherein E is the modulus of elasticity (Young) of the material constituting the return spring.

According to a possible embodiment, the thrust branches have a circular section of diameter d.

According to a possible embodiment, the fixing portion to the caliper body comprises a U-shaped portion, from which extend, from axially opposite sides, said thrust branches, and a pair of elastic tabs for snap fixing to a connection bridge of the caliper body arranged to straddle between said half-bodies.

DESCRIPTION OF THE DRAWINGS

Further features and advantages of the present invention will appear more clearly from the following description of preferred non-limiting embodiments thereof, in which.

Elements or parts of elements in common between the embodiments described below are referred to with the same reference numerals.

DETAILED DESCRIPTION OF THE PREFERRED EMBODIMENTS

Figure 1:
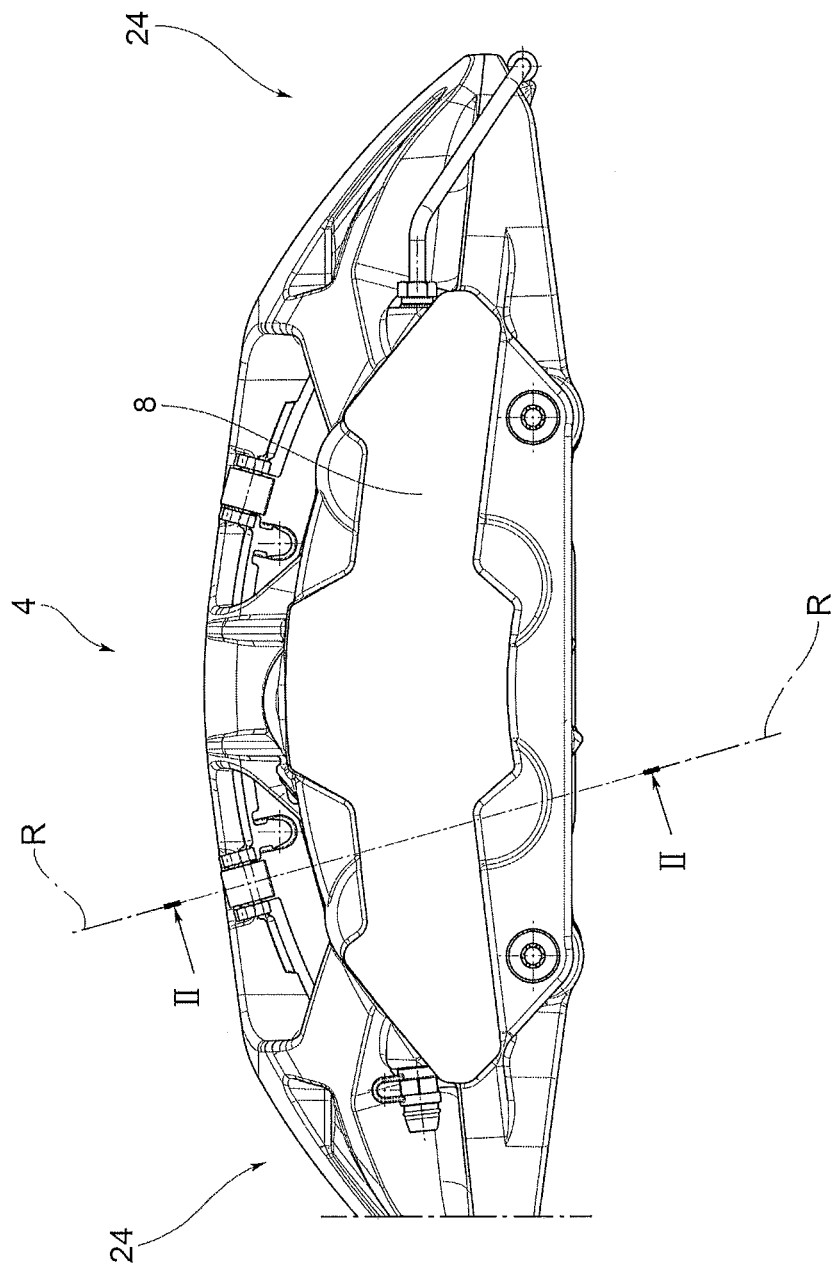
FIG. 1 shows a lateral view of a caliper for disc brake according to the present invention.

With reference to the above figures, reference numeral 4 denotes as a whole a caliper for disc brake having a caliper body 8 provided with a pair of half-bodies 9, 10 interconnected by at least one connection bridge 12.

The caliper body 8 may be monobloc, where the half-bodies 9, 10 are integral with each other, or the half-bodies 9, 10 may be mechanically connected to each other, for example by means of threaded connection means.

The caliper body 8 may be fixed or floating.

The caliper body 8 at least partly delimits a housing compartment 16 for an associable brake disc (not shown) and houses at least one pair of pads 20, 22 arranged on opposite sides to said housing compartment 16, along an axial direction X-X.

The housing compartment 16 has a disc sector shape and is radially delimited by one or more connection bridges 12.

By radial direction R-R it is meant a direction perpendicular to the axial direction X-X and directed towards the axis of rotation of the associable brake disc.

The connection bridges 12, depending on the type of caliper, may be central and/or lateral in a known manner.

The lateral connection bridges 12 are arranged at lateral or tangential ends 24 of the caliper body 8; the central connection bridge 12 is arranged at the thrust pistons of pads 20, 22.

By tangential direction it is meant a direction perpendicular to the axial X-X and radial R-R direction.

Pads 20, 22 comprise a support plate 28 and a friction portion 30 adapted to exert a friction action on the associable brake disc. The support plate 28 and the friction portion 30 may be made in separate parts, preferably of different materials, then assembled together, or pads 20, 22 may also be integrally made.

The present invention applies to any type of pads and/or caliper body: therefore, it also applies to calipers 4 having two or more pads for each half-body 9, 10.

The caliper body 8 comprises at least one thrust piston 32 actuable parallel to the axial direction X-X and at least one axial guide 36 adapted to support and guide pad 20, 22 in the axial direction X-X.

Piston 32 is preferably hydraulically actuated, but the actuation may also be pneumatic or electric. Piston 32 preferably has a cylindrical geometry.

Piston 32 interfaces with the support plate 28 of pad 20, 22 so as to press the friction portion 30 against the associable brake disc.

The caliper body 8 comprises at least one return spring 36 that exerts a return thrust on the support plate 28 of pad 20, 22, directed parallel to the axial direction X-X in a direction of approach F to pistons 32 and of moving away R from the associable brake disc.

The return spring 36 comprises a fixing portion 40 to the caliper body 8 that extends from axially opposite sides in separate thrust branches 44, each thrust branch 44 interfacing with the support plate 28 of the related pad 20, 22.

According to one embodiment, the fixing portion 40 to the caliper body 8 comprises a U-shaped portion 48, from which extend, from axially opposite sides, said thrust branches 44, and a pair of elastic tabs 52 for snap fixing to a connection bridge 12 of the caliper body 8 arranged to straddle between said half-bodies 9, 10.

The elastic tabs 52 may be shaped in various manners to suit the geometry of the connection bridge 12, ensuring a secure attachment to the latter.

For example, the elastic flaps, in order to be sufficiently elastic, are at least partly separated from the fixing portion 40 by the presence of carvings 54 suitably connected through rounded fittings 55.

Each thrust branch 44 comprises a first rectilinear portion 56, which extends from the fixing portion 40 to the corresponding pad 20, 22, a curved portion 60, integral with the first rectilinear portion 56 and folded in approach to the fixing portion 40, and a second rectilinear portion 64 that extends from the curved portion 60 in approach to the fixing portion 40.

Preferably, each thrust branch 44 is made integral with the fixing portion 40, so you have a return spring 36 made as a single piece, preferably of metal material, such as a harmonic type steel.

It should be noted that the first and the second rectilinear portions 56, 64 should not be perfectly rectilinear but may also have curved, concave or convex portions, along the extension thereof.

Advantageously, the second rectilinear portion 64 terminates with a free cantilevered end 68, the second rectilinear portion 64 interfacing with an edge 72 of said support plate 28 and exerting the return thrust thereon.

Advantageously, the cantilevered free end 68 is spaced from the first rectilinear portion 56 and from the fixing portion 40.

Due to the fact that such a cantilevered free end 68 is spaced from the first rectilinear portion 56, i.e. can freely flex with respect to the curved portion 60, the overall stiffness of the return spring 36 has an advantageous pattern with respect to known solutions, as described hereinafter.

According to an embodiment, the curved portion has a circumferential trend that extends for at least 180 degrees, connecting the first and second rectilinear portion 56, 64 with each other.

According to an embodiment, the curved portion 60 ends with a rectilinear appendage 76 that identifies, with the second rectilinear portion 64, on the side opposite to the cantilevered free end 68, a substantially right angle.

The second rectilinear portion 64 is dimensioned so as to interface with the support plate 28 of the pad 20, 22 from a condition of no wear, or minimum wear, of the friction portion (FIG. 2a), to a condition of maximum wear of the friction portion 30 (FIG. 2b), wherein the cantilevered free end 68 interfaces with the support plate 28 in said condition of maximum wear.

Figure 2A:
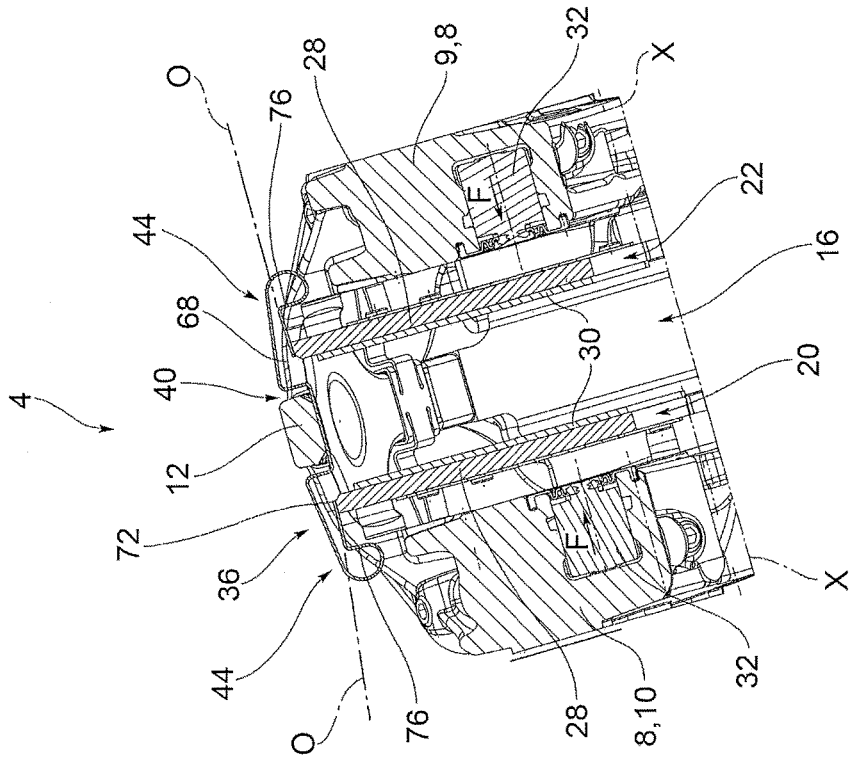
FIG. 2a shows a sectional view along the section plane II-II, of the caliper in FIG. 1 in configuration of new or not worn pad.

The return spring 36 is dimensioned so that, in the condition of no wear, or minimum wear, of the friction portion 30, the second rectilinear portion 64 rests on the support plate 28 so as to be aligned along an oblique direction S-S incident with the axial direction X-X (FIG. 2a).

Figure 2B:
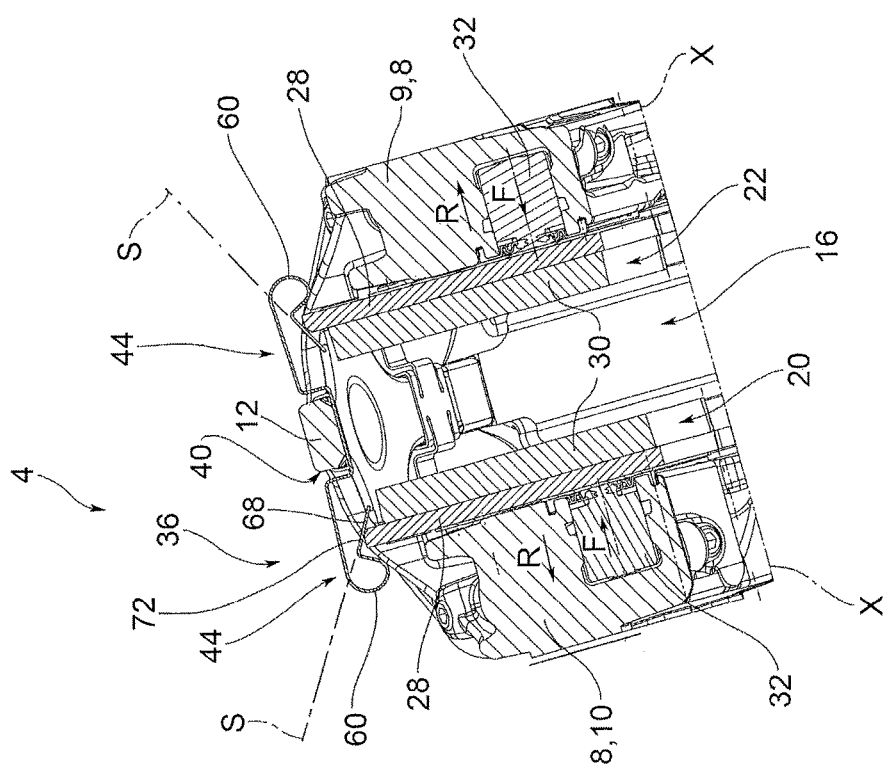
FIG. 2b shows a sectional view along the section plane II-II, of the caliper in FIG. 1 in configuration of worn pad.
Figure 3A:
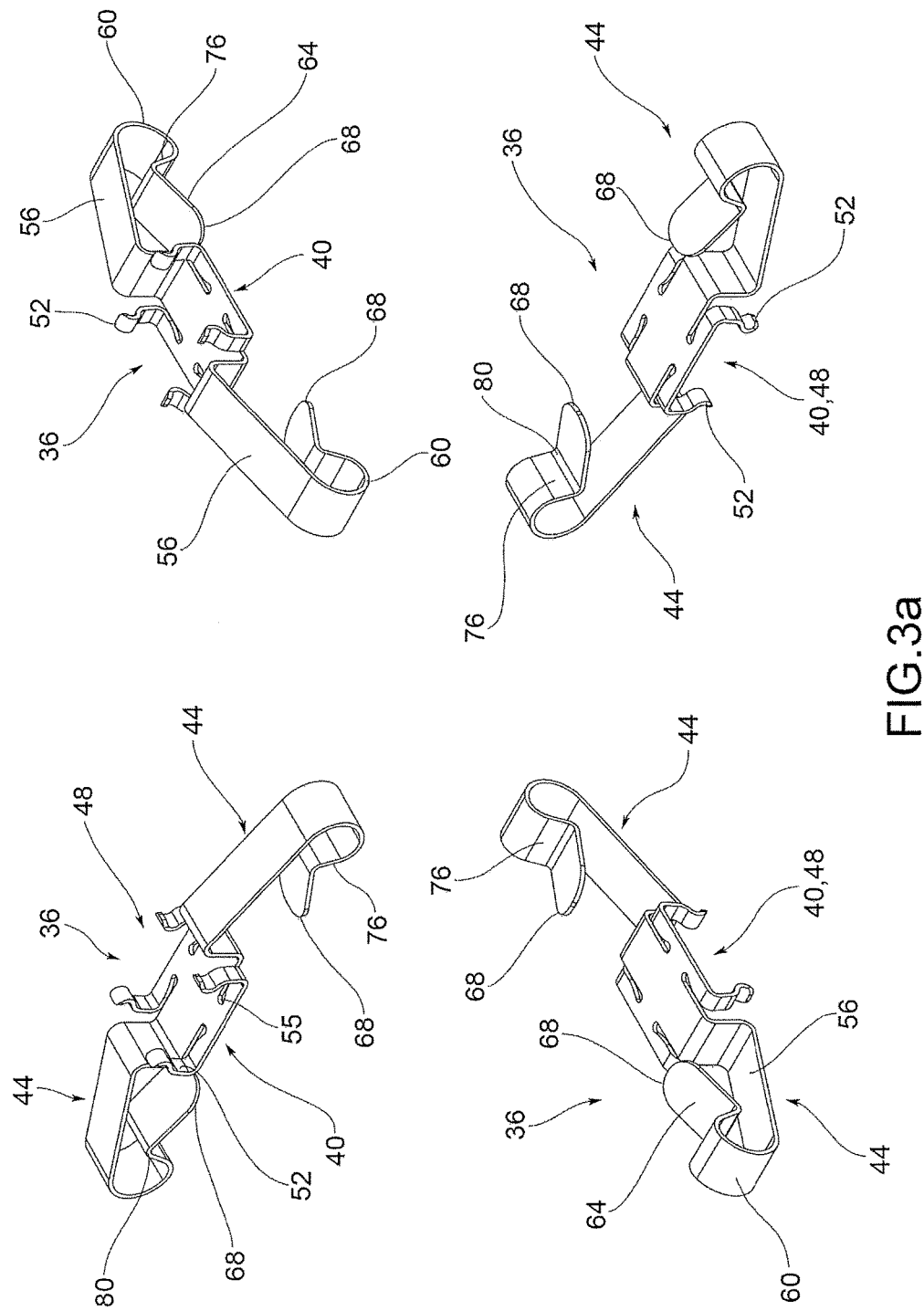
FIGS. 3a-3b show a plurality of lateral and perspective views, from different angles, of a spring of a caliper for disc brake according to the present invention.
Figure 3B:
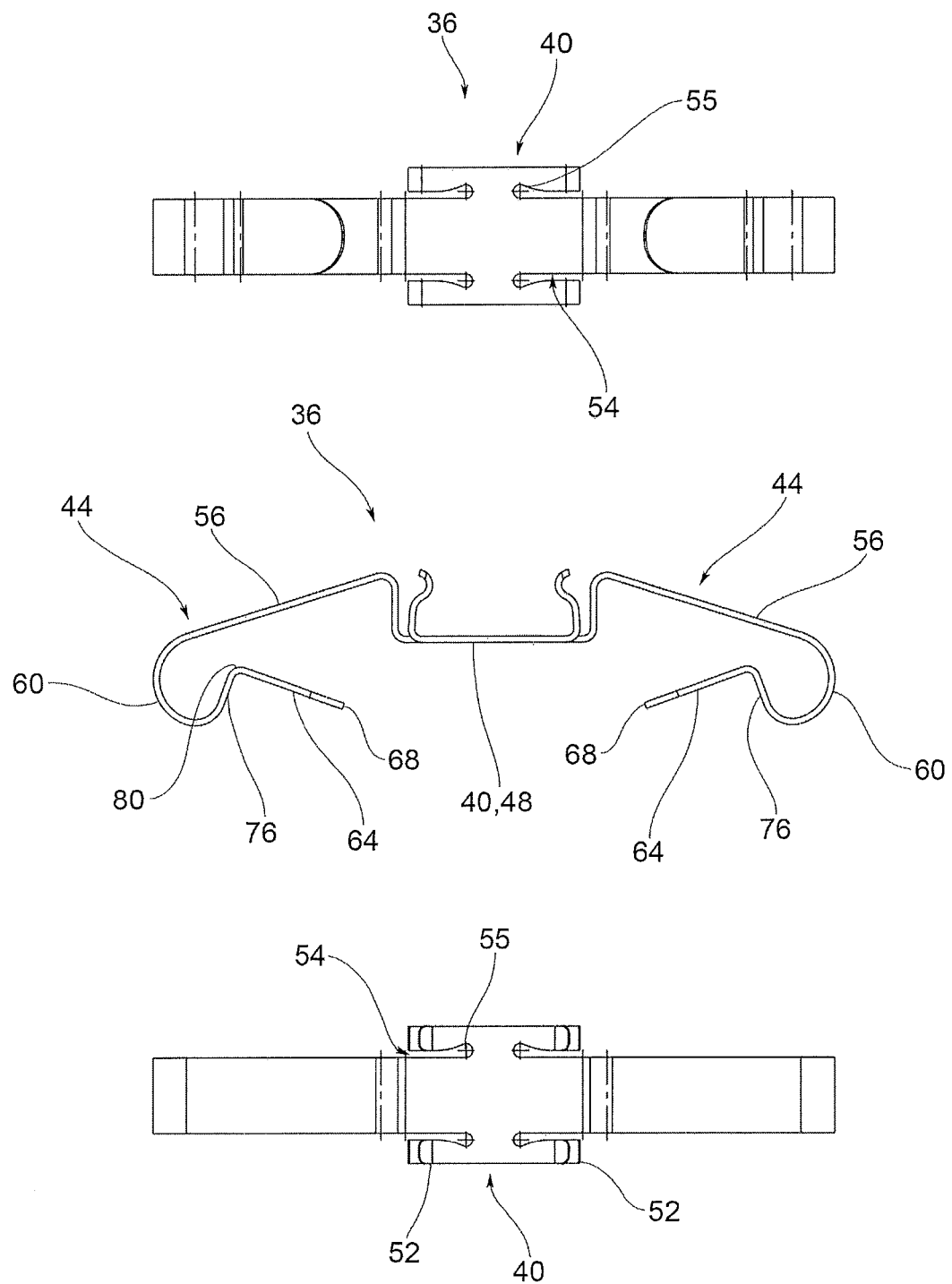

Moreover, the return spring 36 is dimensioned so that, in the condition of maximum wear of the friction portion, the second rectilinear portion 64 rests on the support plate 28 so as to be aligned along a horizontal direction O-O substantially parallel with the axial direction X-X (FIG. 2b).

The return spring 36 is dimensioned so that, in the operating conditions of the pad 20, 22, from the condition of minimum to maximum wear of the friction portion 30, the cantilevered free end 68 always remains spaced from the first rectilinear portion 56 and the fixing portion 40, so as to be free to flex elastically.

This condition of free elastic flexing determines the peculiar and advantageous operation of the return spring 36 according to the present invention.

In particular, each thrust branch 44 is shaped so as to have an equivalent stiffness K defined as follows:

$$K=(K1+K2)/(K1*K2)$$

wherein

K is the equivalent stiffness of each thrust branch 44,

K1 is the stiffness of a leaf spring having a length L1 equal to the distance, projected on the axial direction X-X, between the fixing portion 40 to the caliper body 8 and a connection point 80 between the curved portion 60 and the second rectilinear portion 64, and wherein K2 is the stiffness of a leaf spring having a length L2 equal to the distance, projected on the axial direction X-X, between the fixing portion 40 to the caliper body 8 and the cantilevered free end 68.

Preferably, said thrust branches 44 have a rectangular section having base b and height h, the base being arranged parallel to the axial direction X-X.

According to a further possible embodiment of the present invention, said thrust branches 44 have a circular section of diameter d.

In light of the foregoing, in the case of rectangular cross-section thrust branches 44 having base b and height h, it follows that $$K1 = (E * b * h3)/(4 * L13)$$

$$K2 = (E * b * h3)/(4 * L23)$$

wherein E is the modulus of elasticity (Young) of the material constituting the return spring 36.

In this way, the overall stiffness K of the return spring 36, as seen equal to $K=(K1+K2)/(K1*K2)$, has a substantially constant trend as the degree of wear of the friction portion 30 of pad 20, 22 varies, i.e. as lengths L1 and L2 vary, and therefore as the values of K1 and K2 vary.

This trend strongly differentiates the behavior of the return spring of the present invention from the prior art solutions.

Figure 5:
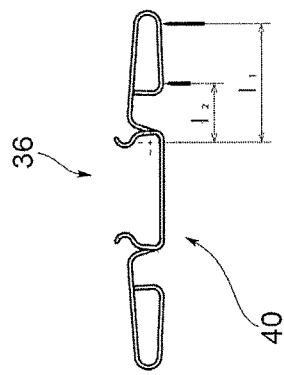
FIG. 5 shows a schematic view of a lead spring of the prior art.
Figure 4:
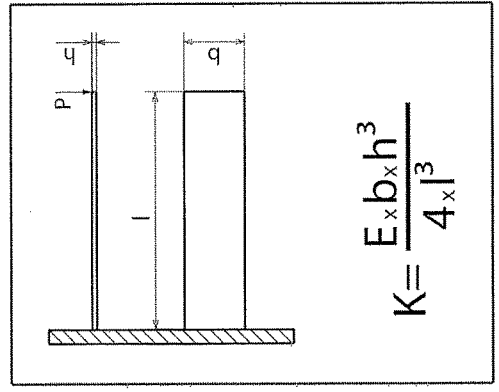
FIG. 4 shows a front view of a return spring according to an embodiment of the present invention.
Figure 4:
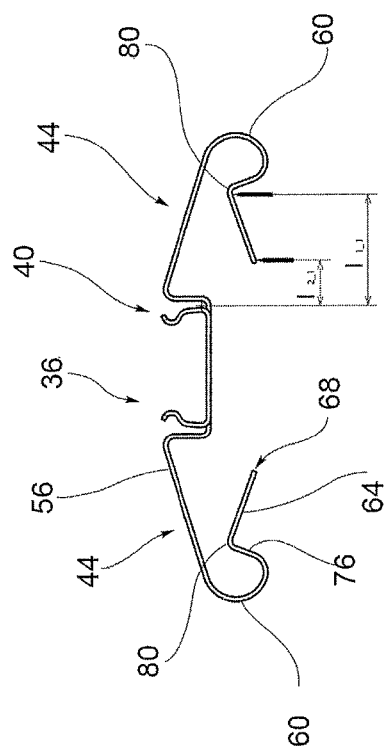

In fact, the known solutions, shown in FIG. 5, are cantilevered leaf springs in which:

$$K1,2 = (E * b * h3)/(4 * L1,23)$$

It is clear that, depending on the degree of wear of the friction material, and therefore by varying length L, said length L, measured in relation to the fixing portion to the caliper body, decreases and therefore the stiffness increases in an inversely proportional manner (and with the cube of the distance). This means that in known solutions (FIG. 5), the stiffness of the return spring increases strongly with the wear of the friction portion while in the solution of the present invention, this does not happen.

In fact, as seen, in the solution of the present invention stiffness varies with the following law:

$$K = (K1+K2)/(K1*K2)$$

Thus, with increasing wear of the friction portion 30 and the passage from the value L1 to the value L2, increasing the stiffness of the single values of K1 and K2 occurs in both the numerator and the denominator; in addition, this increase is greater than the denominator, where the factors are multiplied, and smaller in the numerator, where the factors are added. Overall, by virtue of the architecture of the spring according to the invention, a substantially constant trend of the stiffness is obtained, as the wear of the friction portion varies, as shown in FIG. 6.

Figure 6:
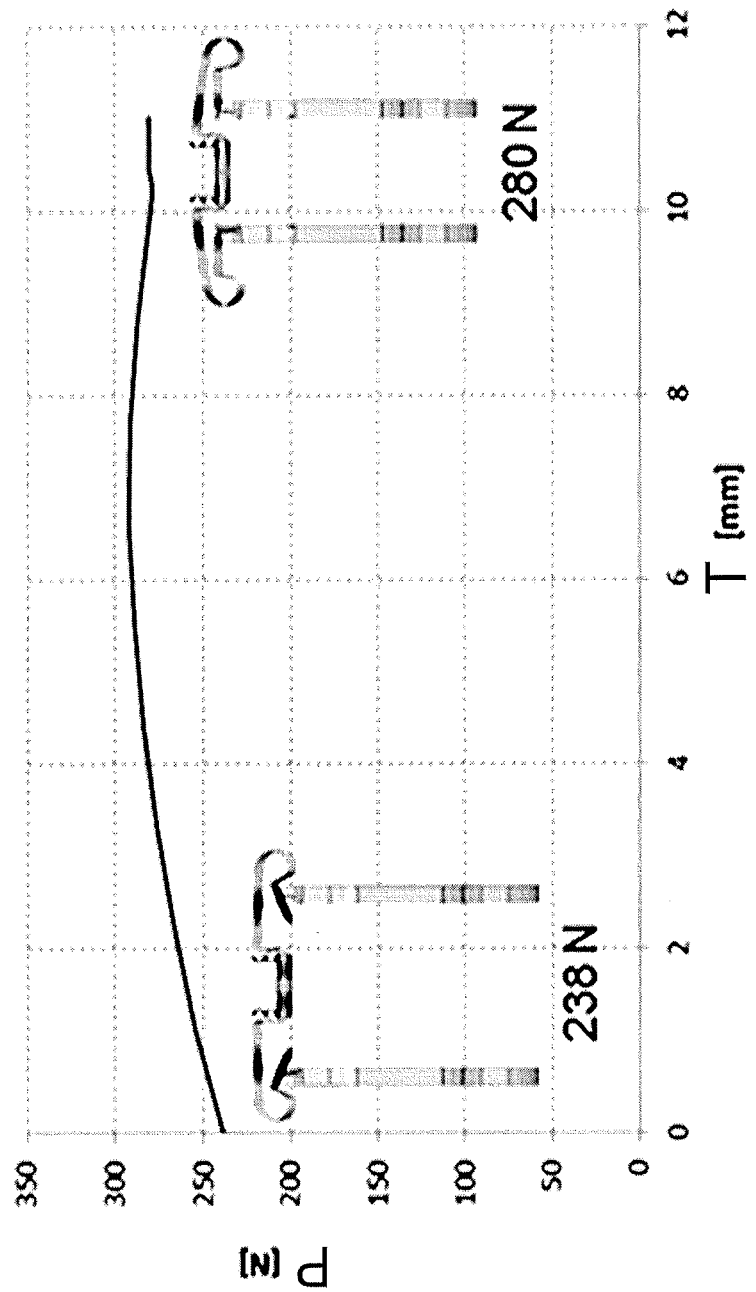
FIG. 6 shows a chart of the elastic force pattern provided by a return spring depending on the degree of wear of a pad, in a caliper for disc brake according to the present invention.

In particular, FIG. 6 shows a chart where the ordinate axis shows the elastic force P exerted by the return spring 36 (in Newton) and the abscissa axis shows the stroke T of pad 20, 22 in mm, of course equal to the degree of wear of the friction portion 30 of pads 20, 22. In the chart in FIG. 6, such an elastic force P exerted by the return spring 36 varies from a minimum value of 238 N to a maximum value of 280 N, for an overall stroke ranging from 0 mm (corresponding to a new pad) to 11 mm (corresponding to maximum wear); this change is absolutely irrelevant or negligible compared to the corresponding variation that one would have using a leaf spring of the prior art, where the force is inversely proportional to the cube of the pad stroke.

As can be seen from the above description, the caliper for brake disc according to the invention allows the drawbacks of the prior art to be overcome.

In particular, with the present invention, the elastic return force exerted by the return springs is substantially constant since it does not vary as the degree of wear of the friction portion of the pad varies.

In this way, it is possible to use a return spring with an elastic return force optimized for each specific solution of caliper for disc brake, having substantial assurance that such a return force will not vary significantly when the degree of wear of the pad varies and thus will not vary during the useful life of the pad itself.

In fact, as seen, the incidence of lever arms or cantilevered portions of the spring with respect to the pad, which in known solutions determines a considerable increase of the spring stiffness as the degree of wear of the pad increases, is compensated since the thrust branches end with cantilevered free ends that are free to elastically flex under the thrust of the pad itself. This compensation is well clarified in the light of the above mathematical formulas, from which it appears that the equivalent stiffness varies both at the numerator and the denominator, so as to remain substantially constant during the useful life of the pad.

In this way, during the release of the brake, the pad is always moved away from the brake disc, in a precise and controlled manner, preventing any type of residual braking torque. Possible jibbing of the pad in retraction are thus prevented, and the pad will move axially without rotating or tilting.

Of course, the caliper for disc brake described may take, in its practical embodiment, also shapes and configurations other than the above without departing from the present scope of protection.

Furthermore, all details may be replaced with technically equivalent elements and dimensions, shapes and materials used may be any according to the needs.

The invention claimed is:

1. Caliper for disc brake comprising a caliper body having a pair of half-bodies interconnected by at least one connection bridge, wherein the caliper body at least partly delimits a housing compartment for an associable disc brake and houses at least one pair of pads disposed on opposite sides to said housing compartment along an axial direction, the pads comprising a support plate and a friction portion suitable to exercise a friction action on the associable brake disc,
   the caliper body comprising at least one thrust piston actuatable in parallel to the axial direction, in which the thrust piston interfaces with the support plate of the pad so as to press the friction portion against the associable brake disc,
   wherein the caliper body comprises at least one return spring that exerts a return thrust on the support plate of the pad, directed parallel to the axial direction in a direction of approach to the pistons and of moving away from the associable brake disc,
   wherein the return spring comprises a fixing portion to the caliper body that extends from axially opposite sides in separate thrust branches, each thrust branch interfacing with a support plate of a related pad,
   wherein
   each thrust branch comprises
   a first rectilinear portion that extends from the fixing portion towards the corresponding pad,
   a curved portion, integral with the first rectilinear portion and folded in approach to the fixing portion,
   a second rectilinear portion that extends from the curved portion in approach to the fixing portion, wherein the second rectilinear portion terminates with a free cantilevered end, the second rectilinear portion interfacing with an edge of said support plate and exerting on said return thrust, the cantilevered free end being spaced from the first rectilinear portion and from the fixing portion and wherein the curved portion terminates with a rectilinear appendage that forms, with the second rectilinear portion, on the side opposite to the cantilevered free end, a substantially right angle.

2. Caliper for disc brake according to claim 1, wherein the curved portion has a circumferential trend that extends for at least 180 degrees, connecting the first and second rectilinear portion with each other.

3. Caliper for disc brake according to claim 1, wherein the second rectilinear portion is dimensioned so as to interface with the support plate of the pad from a condition of no wear, or minimum wear, of the friction portion, to a condition of maximum wear of the friction portion, the cantilevered free end interfacing with the support plate in said condition of maximum wear.

4. Caliper for disc brake according to claim 1, wherein the return spring is dimensioned so that, in the condition of no wear, or minimum wear, of the friction portion, the second rectilinear portion rests on the support plate so as to be aligned along an oblique direction incident with the axial direction.

5. Caliper for disc brake according to claim 1, wherein the return spring is dimensioned so that, in the condition of maximum wear of the friction portion, the second rectilinear portion rests on the support plate so as to be aligned along a horizontal direction parallel with the axial direction.

6. Caliper for disc brake according to claim 1, wherein the return spring is dimensioned so that, in the operating conditions of the pad, from the condition of minimum to maximum wear of the friction portion, the cantilevered free end always remains spaced from the first rectilinear portion and the fixing portion, so as to be free to flex elastically.

7. Caliper for disc brake according to claim 1, wherein each thrust branch is shaped so as to have an equivalent stiffness K defined as:

$$K=(K1+K2)/(K1*K2)$$

wherein

K is the equivalent stiffness of each thrust branch,

K1 is the stiffness of a leaf spring having a length L1 equal to the distance, projected on the axial direction, between the fixing portion to the caliper body and a connection point between the curved portion and the second rectilinear portion, and wherein K2 is the stiffness of a leaf spring having a length L2 equal to the distance, projected on the axial direction, between the fixing portion to the caliper body and the cantilevered free end.

8. Caliper for disc brake according to claim 1, wherein said thrust branches have a rectangular section having base b and height h, the base being arranged parallel to the axial direction.

9. Caliper for disc brake according to claim 7, wherein the thrust branches have a rectangular section having base b and height h, the base being arranged parallel to the axial direction, wherein $$K1=(E*b*h3)/(4*L13)$$

$$K2=(E*b*h3)/(4*L23)$$

and wherein E is the modulus of elasticity (Young) of the material constituting the return spring.

10. Caliper for disc brake according to claim 1, wherein said thrust branches have a circular portion of diameter d.

11. Caliper for disc brake according to claim 1, wherein the fixing portion to the caliper body comprises a U-shaped portion, from which extend, from axially opposite sides, said thrust branches, and a pair of elastic tabs for snap fixing to the connection bridge of the caliper body arranged to straddle between said half-bodies.

* * * * *